Patented Dec. 1, 1925.

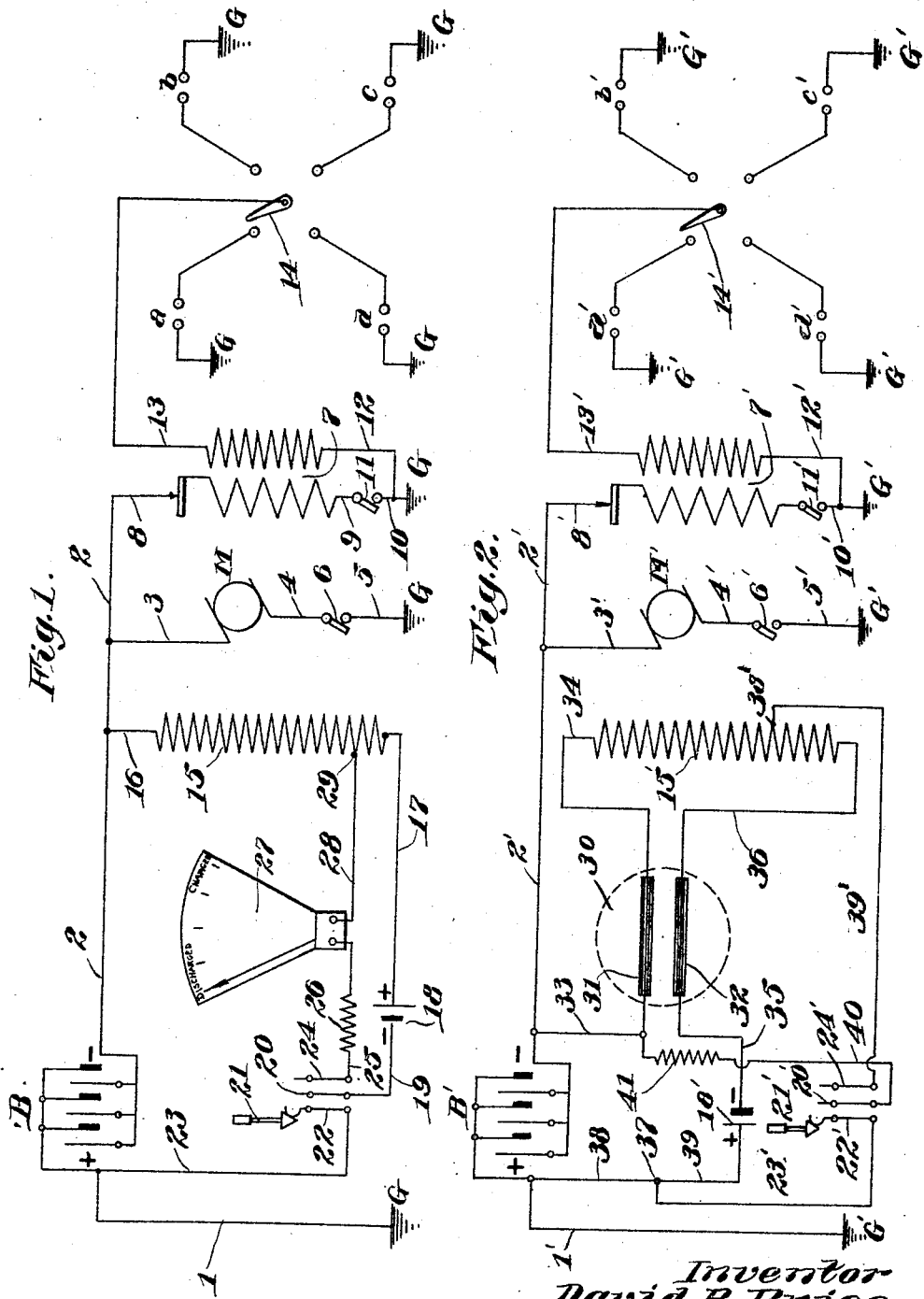

1,563,525

UNITED STATES PATENT OFFICE.

DAVID R. PRICE, OF NEWTONVILLE, MASSACHUSETTS, ASSIGNOR OF ONE-HALF TO CURTIS DELANO, OF NEWTONVILLE, MASSACHUSETTS.

ELECTRICAL SYSTEM FOR MOTOR VEHICLES.

Application filed July 15, 1919. Serial No. 311,043.

*To all whom it may concern:*

Be it known that I, DAVID R. PRICE, citizen of the United States of America, and resident of Newtonville, in the county of Middlesex and State of Massachusetts, have invented new and useful Improvements in Electrical Systems for Motor Vehicles, of which the following is a specification.

This invention relates to an electrical system for a motor vehicle, and more particularly to a method or art of and devices for determining the condition of the storage battery customarily employed in such a system.

The electrical system of a motor vehicle is a vital portion of the mechanism, the veritable nerve center which radiates from the storage battery for controlling the starting and ignition of the motor, for operating the signals associated with the vehicle and for furnishing energy for the lighting system. Therefore it is extremely important that the battery be kept in a properly charged condition, neither permitted to become overcharged or entirely discharged. Heretofore so far as I am aware the condition of the storage battery has been determined either by the expedient of using a hydrometer to test the specific gravity of each cell of the battery or by connecting a voltmeter directly across the terminals of the battery. In practice, neither instrument is reliable or satisfactory in the hands of the unskilled. The average user is concerned with overload and under charge only, and does not depend upon instruments to find the state of normal charge or discharge.

The voltage of a fully charged storage battery in good condition and carrying a normal load is slightly higher than the voltage when in various stages of discharge; the stage of charge or discharge is measured by relatively slight changes in the voltage of the battery. If when carrying its normal load the voltage is measured very accurately, the degree of charge of the battery can be determined, and this has been the practice heretofore by engineers and scientific persons when any attempt has been made to observe the amount of charge residing in a storage battery. Since the difference in voltage between the charged and discharged condition is relatively small such measurements have been for the scientist rather than for motor car drivers in general. The voltage difference has not been heretofore, so far as I am aware, indicated with sufficient accuracy except by very accurate and expensive voltmeters suitable for laboratory use, and not suitable to convey a comprehensive idea of the state of the battery to the ordinary non-scientific automobile driver without further interpretation. As a concrete example, the normal voltage across the terminals of the battery may be about 2 volts per cell and a full charge may bring this voltage up to about 2.1 volts. The range in voltage between the two conditions is then but .1 volt, and the difference in voltage to be read is only one part in 20 of the normal charge voltage, and this small difference in voltage which must be used as the index of state of charge, is not strikingly apparent to the unskilled electrician. It is apparent then that none but sensitive and expensive instruments can be relied upon to register these small differences with sufficient accuracy for practical purposes.

If however the small difference in potential between the fully charged condition and the discharged condition of the battery can be registered by a full scale deflection of the indicating instrument, a much less expensive instrument may be employed with far more accurate results than heretofore obtained, and its indications made obvious to the driver. It is therefore a principal object of my invention to overcome the difficulties heretofore encountered, to provide a simple and accurate method of indicating the condition of a storage battery, and to provide simple and inexpensive means for indicating the condition of a storage battery and particularly of a battery such as is employed on motor vehicles for delivering energy to the starting, igniting and lighting system of the vehicle.

Other objects of my invention will appear from the following description of concrete examples of the invention and the accompanying drawings in which, Fig. 1 is a diagram of the principal circuit connections of the electrical system of a motor vehicle showing one embodiment of my invention as applied thereto; and Fig. 2 is a diagram of circuit connections similar to those illustrated in Fig. 1 but showing a further embodiment of my invention.

In the accompanying drawings I have disclosed two circuit arrangements adapted respectively for the employment of instruments of different types, but each circuit being so arranged that a full scale deflection is obtained upon the instrument when the difference in potential range of the usual 6 volt storage battery is only 0.4 of a volt more or less.

Referring to Fig. 1 in which I have disclosed the preferred form of my invention I have illustrated an electrical system such as is customarily employed for delivering energy from a storage battery to the internal combustion engine of a motor vehicle. The storage battery is shown at B having its positive terminal grounded by conductor 1 at G, as for example upon the chassis of the vehicle, and its negative terminal connected to a cable 2. The cable 2 may be connected to one terminal of the engine starting motor M by conductor 3, the other terminal of which is connected to ground G by conductors 4 and 5 and the starting switch 6. The cable 2 is also connected to one terminal of the primary winding of the spark coil 7 through conductor 8, the other terminal of the spark coil being connected to ground G through conductors 9 and 10 and the ignition switch 11. The secondary winding of the spark coil 7 is connected into the ignition circuit of the engine which extends from ground G through conductor 12, the secondary winding of coil 7, and conductor 13 to the rotary arm 14 of the distributor, and from thence in succession through the spark-gaps $a$, $b$, $c$ and $d$ to ground G as the distributor arm rotates.

For the purpose of securing at any desired moment an indication of the condition of the storage battery, which condition as hereinbefore set forth is manifested by the potential across the terminals of the battery when it is carrying its normal load, a resistance 15, perferably formed from wire having a zero temperature coefficient and of sufficient capacity to carry at least one ampere, is connected by one of its terminals to cable 2 through conductor 16. The other terminal of the resistance is connected by a conductor 17 to the positive terminal of a source of standard potential as for example a dry cell 18. The negative terminal of the cell is connected by a conductor 19 to the middle contact spring 20 of the switch 21, which for convenience may be positioned on the dash-board of the vehicle. The left-hand spring 22 of the switch is connected by a conductor 23 to the positive terminal of the storage battery B. The right-hand spring 24 of the switch is connected by a conductor 25 through a meter calibrating resistance 26 to one terminal of the meter or indicating instrument 27, the other terminal of the instrument being connected by a conductor 28 to the resistance 15 at point 29. The instrument 27 is preferably mounted upon the dash-board of the vehicle in proximity to the switch 21. The point 29 at which conductor 28 is connected to the resistance 15 is so selected that when the switch 21 is completely closed, for a certain condition of the storage-battery there will be no flow of current through the resistance 26 and instrument 27.

Assuming that the junction point 29 is so selected that no current flows through the instrument 27 when the storage battery is in a discharged condition, the operation of the indicating system is as follows: When the switch 21 is depressed a series circuit is closed through the storage battery B, conductors 2 and 16, resistance 15, conductor 17, cell 18, conductor 19, contact springs 20 and 22 of the switch 21 and thence through conductor 23 back to the battery B. Further depression of the switch 21 closes the contact between springs 22, 20 and 24 bridging the instrument 27 between the junction point 29 and the junction point between the adjacent terminals of the storage battery B and the cell 18 formed through the contact between the springs of the switch 21. Current will now tend to flow through one branch of the circuit from the positive terminal of the storage battery through conductor 23, contact springs 22, 20 and 24, resistance 26, instrument 27, conductor 28 to junction point 29, and thence back to the negative terminal of the battery through the upper portion of the resistance 15 and conductors 16 and 2. At the same instant current will tend to flow through the other branch of the circuit from the positive terminal of the cell 18 through conductor 17, the lower portion of resistance 15, junction point 29, conductor 28, instrument 27, resistance 26, contact springs 24 and 20, and thence by conductor 19 back to the negative terminal of the cell 18. Current flowing from the battery B and from the cell 18 will thus flow in opposite directions through the instrument and if the battery is discharged will substantially oppose each other producing no potential difference across the terminals of the instrument and no effect upon the instrument. The instrument pointer will therefore remain at one end of the scale which for convenience may be labeled Discharged. Should the storage battery B become charged, the balance between the two branches of the circuit will be disturbed as the potential across the terminals of the storage battery B will rise while the potential across the terminals of the cell 18 will remain substantially constant. The resulting rise of potential across the battery terminals will cause a difference of potential across the instrument terminals or between the junction point 29 and the springs 20, 22, 24 which will be registered by a deflection of the pointer of the instrument. If the battery has been charged to its upper safe limit the pointer will register a full scale deflection which may conveniently be labeled Charged.

That the difference of potential between the junctions to which the instrument is connected depends upon the charge of the battery B, is evident from the following considerations. If the terminal 29 were pushed to the upper terminal of the resistance 15 the instrument would attempt to register the voltage of the battery B, whereas on the other hand if the junction 29 were pushed to its lower extreme it would attempt to register the voltage on cell 18. Since the instrument indications for the battery B and the cell 18 are opposite as the above discussion of the circuits indicates, there is a point along the resistance 15 where no difference of potential will exist between the junctions of the branched circuit. This point may be so selected that for a discharged condition of the storage battery B no potential difference will exist between the junctions and the instrument 27 will register zero or discharged.

A low grade inexpensive voltmeter having a full scale deflection on .02 volt without added resistance may thus be employed and adjusted to give a full scale deflection for any desirable change in voltage of the storage battery by adjusting the resistance 26.

In Fig. 2 I have shown an alternative circuit arrangement for indicating the condition of the battery, parts similar to those of Fig. 1 being designated by primed reference characters. In this instance I have shown an indicating instrument 30 preferably of the D'Arsonval type having two armature coils 31 and 32 each of which is capable of producing a full scale deflection on a potential of about .04 volt. The coil 31 is connected between the negative terminal of the storage battery B' and the upper terminal of the resistance 15' by conductors 33 and 34. The coil 32 is connected by conductors 35 and 36 between the negative terminal of the cell 18' and the lower terminal of resistance 15', the positive terminals of the battery and cell being connected to the junction point 37 by the conductors 38 and 39 respectively. The junction point 37 is connected by a conductor 23' to the left-hand contact spring 22' of switch 21', and the junction point 38' on resistance 15' is connected to the right-hand contact spring 24' of switch 21' by a conductor 39.' The middle contact of the switch is connected through conductors 40 and 33 and the resistance coil 41. The junction point 38' is selected so that for a discharged condition of the storage battery B', for example, the current flowing from the storage battery through the coil 31 of the instrument will be equal to the current flowing through the coil 32 of the instrument from the cell 18'. These coils will therefore have an equal and opposite effect upon the pointer of the instrument and no deflection will be registered. The point on the instrument scale for no deflection may for convenience be marked Discharged.

To obtain an indication of the condition of the battery B', the switch 21' is depressed first closing contact between spring contacts 22' and 20', thereby closing a loading circuit across the terminals of the storage battery which may be traced as follows: from the positive terminal of the battery, conductors 38 and 23', contact springs 22' and 20', conductor 40, loading resistance 41 (which may for convenience have a large current carrying capacity for example up to 10 amperes) and thence over conductor 33 to the negative terminal of the battery. The battery is thus placed in a loaded condition substantially equivalent to its normal load prior to the closure of the indicating circuits which takes place as soon as the switch 21' is wholly depressed to close its three spring contacts together. Current will now flow as hereinbefore described from the storage battery and flow from the cell 18' through the coils of the indicating instrument. If as assumed the storage battery is in a discharged condition the instrument will register no deflection as the circuits are initially balanced for this condition. If however the battery is in a fully charged condition the voltage of the storage battery will be higher and more current will flow through the coil 31 of the instrument than when the battery is discharged. The circuits will now be unbalanced and for a fully charged condition of the storage battery the instrument will register a full scale deflection which for convenience may be designated Charged upon the scale.

While closure of the contacts 22 and 20 of switch 21 in Fig. 1 places a load upon the storage battery B by connecting the resistance 15 in series with it prior to the connection of the instrument 27 across the circuit, it may be desirable to further load the battery B before connecting up the instrument for a reading. This may be accomplished by connecting a resistance directly across the terminals of the battery B by springs of the switch 21 in the manner at 41 shown in Fig. 2.

While for the purpose of exemplification I have described the circuits of my improved indicating system as initially balanced for a discharged condition of the storage battery, the charged condition of the battery being indicated by a full scale deflection of the indicating instrument through the unbalanced effect of the charged condition of the battery upon the circuits, it is to be understood that the circuits could equally well be initially balanced for any desired battery condition. Further if desired the instrument could instead of indicating battery condition in terms of charge or discharge, indicate change in the battery potential or specific gravity.

It is apparent from the foregoing description that I have provided an improved method for simply and accurately indicating the condition of the storage battery of the electrical system of a motor vehicle, that I have provided apparatus for carrying out my method which is simple to install, inexpensive and accurate in its functioning, and which provides an indication of the condition of the storage battery which is comprehensive at a glance, to the ordinary driver or operator of the motor vehicle.

I claim:

1. In an electrical system, the combination of a storage battery, a working circuit in series with said storage battery, a branched circuit in parallel with said circuit including said storage battery in one branch thereof, a source of standard potential in the other branch of said branched circuit, an indicator, means for connecting said indicator into said branched circuit, and resistance means whose resistance is fixed in value and divided between the branches of said branched circuit, the divided portions of said resistance means having such resistance that when the storage battery is discharged the indicator deflection is zero and when the battery is fully or partly charged the deflection registers the amount of said charge.

2. In an electrical system the combination of a storage battery, a working circuit in series with said battery, a circuit in parallel with said first circuit including in series therein said storage battery, a source of standard potential and a fixed resistance element, an indicator, and means for connecting said indicator from a junction in said second circuit between said storage battery and said source of potential to a point intermediate the terminals of said resistance element whereby when the storage battery is discharged the indicator deflection is zero and when the battery is fully or partly charged the deflection registers the amount of said charge.

3. In an electrical system the combination of a storage battery, a load circuit in series with said battery, a circuit in parallel with said first circuit including in series therein said storage battery, a source of standard potential and a fixed resistance element, an indicator, and switching means for first closing said second circuit and subsequently for connecting said indicator from a junction in said second circuit between said storage battery and said source of potential to a point intermediate the terminals of said resistance element whereby when the storage battery is discharged the indicator deflection is zero and when the battery is fully or partly charged the deflection registers the amount of said charge.

4. In an electrical system the combination of a storage battery, a working circuit in series with said storage battery, a branched circuit in parallel with said circuit including said storage battery in one branch thereof, a source of standard potential in the other branch of said branched circuit, an indicator, means for connecting said indicator between the junctions of said branched circuit, and resistance means whose resistance is fixed in value and divided by one of said junctions between the branches of said branched circuit, the divided portions of said resistance means having such resistance respectively that when the storage battery is discharged the branches of said branched circuit will balance each other and said indicator will register no indication, and when said storage battery becomes charged said branches will become unbalanced and said indicator will register a substantial indication.

Signed by me at Boston, Massachusetts, this 8th day of July, 1919.

DAVID R. PRICE.